United States Patent [19]

Coderre

[11] Patent Number: 5,272,562
[45] Date of Patent: Dec. 21, 1993

[54] CUBE-CORNER RETROREFLECTIVE ARTICLES

[75] Inventor: James C. Coderre, Lake Elmo, Minn.

[73] Assignee: Minnesota Mining and Manufacturing Company, St. Paul, Minn.

[21] Appl. No.: 14,334

[22] Filed: Feb. 5, 1993

[51] Int. Cl.⁵ .............................................. G02B 5/122
[52] U.S. Cl. ..................................... 359/529; 359/530; 428/40
[58] Field of Search ............... 359/515, 527, 529, 530, 359/532, 536, 546, 547, 539; 428/40, 323

[56] References Cited

U.S. PATENT DOCUMENTS

| | | | |
|---|---|---|---|
| 3,420,597 | 1/1969 | Nellessen et al. | 359/539 |
| 3,684,348 | 8/1972 | Rowland | 359/530 |
| 4,025,159 | 5/1977 | McGrath | 359/536 |
| 4,055,377 | 10/1977 | Erickson et al. | 359/539 |
| 4,618,518 | 10/1986 | Pricone et al. | 428/40 |
| 4,763,985 | 8/1988 | Bingham | 359/536 |
| 4,801,193 | 1/1989 | Martin | 359/532 |

*Primary Examiner*—Loha Ben
*Attorney, Agent, or Firm*—Gary L. Griswold; Walter N. Kirn; Karl G. Hanson

[57] ABSTRACT

A retroreflective article (30, 50) has opaque pigment particles (38, 58) dispersed in a retroreflective region (33, 53) of a front portion (35, 55) of a sheeting (32, 52) that includes a body portion (34, 54) and a multitude of cube-corner elements (36, 56). The opaque pigment particles (38, 58) scatter white, yellow, or light brown light to allow the retroreflective article to demonstrate improved lightness and, if colored fluorescent, improved fluorescence. The improvement in lightness and fluorescence makes the retroreflective articles more conspicuous to persons during the daytime.

26 Claims, 3 Drawing Sheets

CUBE-CORNER RETROREFLECTIVE ARTICLES

FIELD OF THE INVENTION

This invention pertains to (i) a cube-corner retroreflective article that provides a superior daytime lightness and (ii) a method of making the same.

BACKGROUND OF THE INVENTION

Retroreflective articles have the ability to return incident light back in the direction from which the light originated. This unique ability has led to the widespread use of retroreflective articles on a traffic signs. At nighttime, light from motor vehicle headlights is retroreflected by the articles to display information on the sign to motor vehicle drivers. During daylight hours, if the retroreflective articles have a sufficient daytime lightness to make the sign readily noticeable to passing motorists, daytime motor vehicle drivers may become privy to the same information. An ongoing goal in the retroreflective art, therefore, has been to provide retroreflective articles that demonstrate good nighttime retroreflectivity and sufficient daytime lightness to make the articles readily noticeable to passing motorists at any time of the day.

An example of a commonly used and good performing retroreflective article is a cube-corner retroreflective sheeting. A cube-corner retroreflective sheeting employs a multitude of cube-corner or prismatic elements to retroreflect the incoming light. Each cube-corner element has three planar faces that meet at an apex. At the base of each element is a sheet-like body portion (also known as a "land") which unites the cube-corner elements in the form of a sheeting. Light which is retroreflected typically enters the sheeting through a cover layer, passes through the body portion to strike the cube surfaces, and is reflected back in the direction from which the light entered the sheeting. A color is often provided to a cube-corner sheeting by incorporating a dye or transparent pigment into the body portion or cube-corner elements.

A fairly common cube-corner retroreflective sheeting has a metallic coating applied to the backside of the cube-corner elements to promote retroreflection; see for example, U.S. Pat. No. 3,684,348. While it is known that the metallic coating can improve the sheeting's retroreflective performance, it is also known that the metallic coating can have a detrimental effect on daytime lightness. The metallic coating, which is often aluminum, imparts an undesirable grayish daytime color to the sheeting, making information on the sign more difficult to read. This drawback makes metallic coated cube-corner sheetings much less likely to be used on signs that require good daytime lightness.

To improve the daytime lightness of metallic coated, cube-corner sheetings, the inventors of U.S. Pat. No. 4,801,193 developed a method of removing a predominant portion of the metallic coating from the back side of the cube-corner elements. This removal is accomplished by superimposing a second coating material over a minor portion of the metallic coating in a grid-like pattern and then exposing the coated cube-corner elements to a solvent to remove the metallic coating from the non-superimposed areas. A metallic coating in the form of a grid results. A backing element is then adhered to the backside of the cube-corner sheeting along the grid lines but is spaced apart from the cube-corner elements over the areas where the metallic coating has been removed. The patent discloses that upon observation of the sheeting in ambient light, a grayish grid pattern may be seen, which represents the residual metal on the backside of the cube-corner elements. Lighter areas between the grid lines are displayed which are characteristic of the areas where the metallic coating has been removed.

Figure 1:
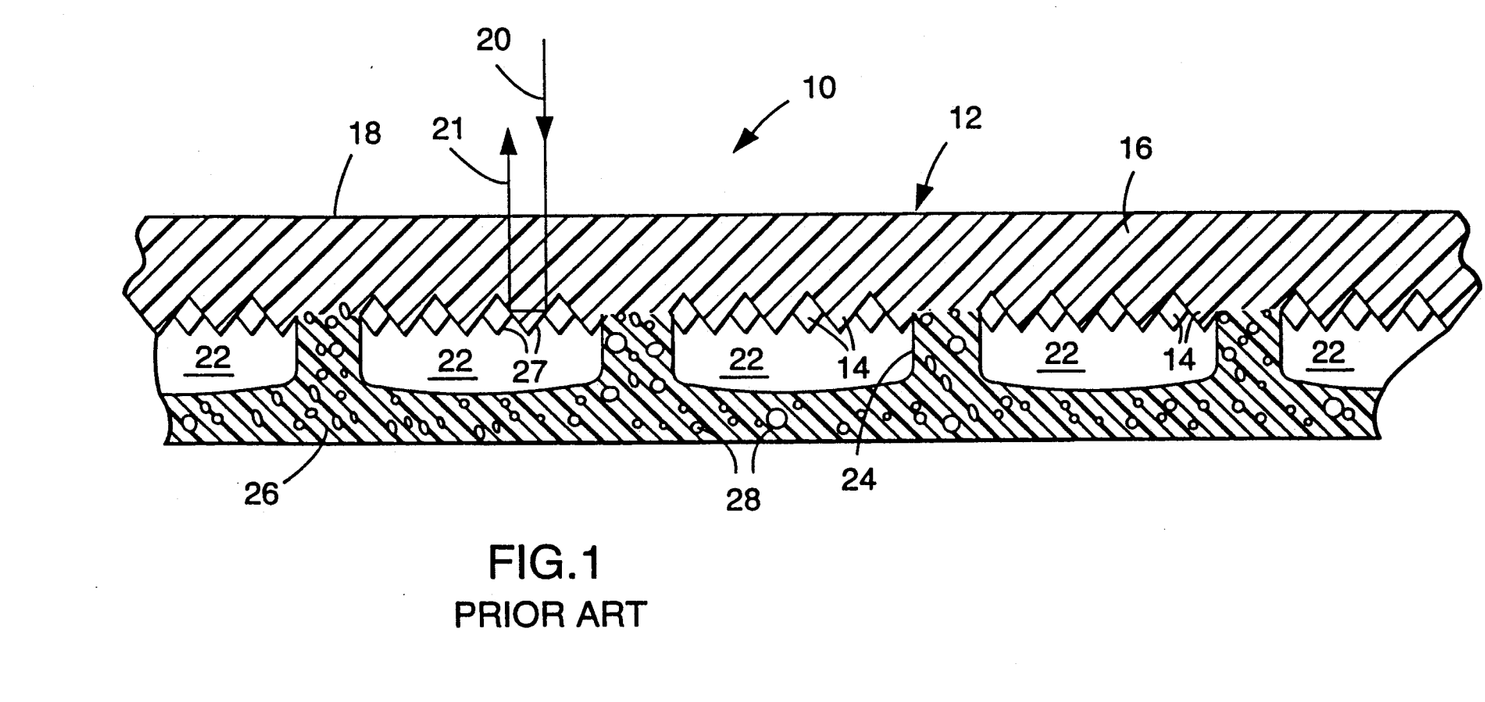
FIG. 1 is a cross-sectional view of a prior art retroreflective sheeting 10.

Another known approach for improving daytime lightness in a cube-corner sheeting involves placing opaque pigment particles that scatter white light in a base layer of the cube-corner sheeting. This approach does not rely on a metallic coating to promote retroreflection but instead employs a plurality of hermetically-sealed air chambers, which allow air to interface with the back side of the cube-corner elements without interference from moisture, dirt, and the like. A retroreflective article having this construction is shown in FIG. 1 where numeral 10 designates the retroreflective article.

Retroreflective article 10 includes a cube-corner sheeting 12 that has cube-corner elements 14 and a body portion 16. The body portion 16 has a smooth surface 18 through which light (such as from an automobile headlamp) passes in the direction of arrows 20 and 21. The incident light 20 strikes surfaces of cube-corner elements 14 and is reflected back in the direction 21 from which it originated. Air in hermetically-sealed air chambers 22 interfaces with the back side 27 of cube-corner elements 14 to promote the retroreflection of the incident light. Sealed chambers 22 are enclosed by a base layer 26 that is secured to sheeting 12 at bonding regions 24.

Retroreflective article 10 exhibits good daytime lightness by having opaque, white pigment particles 28 dispersed in the base layer 26. In the base layer's bonding region 24, the pigment particles 28 scatter the incident light to display a relatively light daytime color to the viewer. The cube-corner element/air interface also assists in improving lightness of the article 10. An article having this kind of construction has been sold for many years by 3M as Scothlite ™ Diamond Grade Reflective Sheeting.

SUMMARY OF THE INVENTION

In accordance with the present invention, a new cube-corner retroreflective article is provided that exhibits an extraordinarily good daytime lightness. The retroreflective article of this invention comprises:

a sheeting having a front portion that includes a retroreflective region that has a body portion and a plurality of cube-corner elements which project away from the body portion; and opaque pigment particles that have lightness improving properties, the opaque pigment particles being dispersed in the retroreflective region of the front portion of the sheeting.

In another aspect, the present invention provides a method of making a retroreflective article, which comprises:

dispersing opaque pigment particles in at least a retroreflective region of a front portion of a sheeting that contains a plurality of cube-corner elements, wherein the dispersed opaque pigment particles possess lightness improving properties.

As the terms are used herein, "front portion" means the portion of a retroreflective article through which incident light passes, and "retroreflective region" means those part(s) of the front portion of a cube-corner sheeting where the incident light is capable of being retroreflected. In the retroreflection region(s) of front portion of the retroreflective article, the opaque pigment particles may be located, for example, in the body portion or cube-corner elements or in an overlay film that is located on top of the cube-corner sheeting or in a combination of these parts of the front portion. The term "lightness improving properties" means possessing the ability to improve the lightness of the sheeting in which the opaque pigment particles are dispersed.

It was discovered in this invention that by dispersing opaque pigment particles that have lightness improving properties in the retroreflective region(s) of the front portion of a retroreflective article, daytime lightness can be increased substantially without destroying nighttime retroreflectivity. Opaque pigment particles that have lightness improving properties are known to scatter incident light in a diffuse manner, and therefore it was expected that the particles would seriously compromise retroreflectivity by causing the incident light to be scattered randomly. Instead, however, it was surprisingly discovered that good retroreflection is obtained by the cube-corner retroreflective articles of this invention—in spite of the presence of the opaque pigment particles.

In addition to improving lightness while retaining retroreflectivity, it also was surprisingly discovered that a significant increase in fluorescence can be achieved by the dispersement of the opaque pigment particles in the front portion of a fluorescent-colored, cube corner sheeting. An improvement in fluorescence makes a fluorescent retroreflective article more conspicuous to viewers during the daytime. Thus, a fluorescent article of this invention can have extraordinary conspicuity by providing contemporaneous improvement in both lightness and fluorescence.

The above and other advantages and aspects of the invention are more fully illustrated in the detailed description of this invention and drawings, where like reference numerals are used to represent similar parts. It is to be understood, however, that the description and drawings are for the purposes of illustration only and should not be read in a manner that would unduly limit the scope of this invention.

DETAILED DESCRIPTION OF THE PREFERRED EMBODIMENTS

In describing the preferred embodiments of the invention, specific terminology will be used for the sake of clarity. The invention, however, is not intended to be limited to the specific terms so selected, and it is to be understood that each term so selected includes all the technical equivalents that operate similarly.

Figure 2:
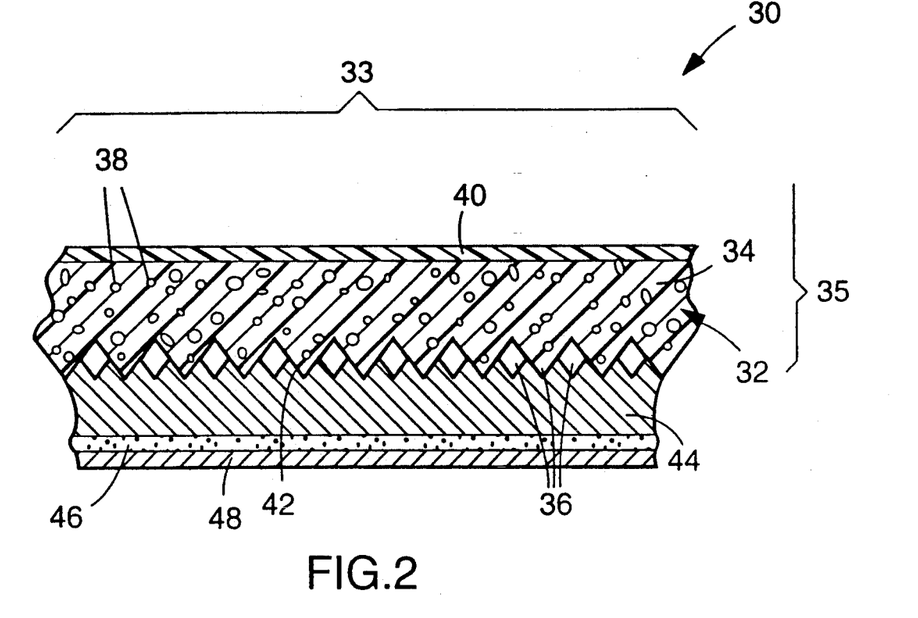
FIG. 2 is a cross-sectional view of a retroreflective article 30 in accordance with the present invention.

Referring to FIG. 2, an example of a retroreflective article 30 is shown which includes a cube-corner sheeting 32 that has a retroreflective region 33 in a front portion 35 of the article 30. Front portion 35 includes a body portion 34 and a plurality of cube-corner elements 36 which project away from the body portion 34. Dispersed throughout the front portion 35 of cube-corner sheeting 32 are opaque pigment particles 38 which have lightness improving properties. As shown, opaque pigment particles 38 may be located in the body portion 34 and in the cube-corner elements 36 of sheeting 32. An overlay film 40 can be provided to protect the cube-corner sheeting 32 from ultra-violet rays and abrasion. Opaque pigment particles 38 which have lightness improving properties also can be incorporated into the overlay film 40. However, it is preferred that the opaque pigment particles be located in the cube-corner sheeting 32 because the light path through the sheeting 32 typically is significantly longer than the light path through the overlay film 40. A longer light path allows a lower concentration of pigment particles 38 to be used in the retroreflective sheeting and provides more color uniformity. It is to be understood that the opaque pigment particles can be placed in a combination of the body portion 34, cube-corner elements 36, and overlay film 40, or in other layers of a front portion of a retroreflective sheeting.

To promote retroreflectivity, the back side of cube-corner elements 36 can interface with a reflective material (for example metal) or a material that has a significantly different refractive index from the polymeric material of the cube-corner elements (for example, air). A metallic coating 42 can be placed on the back side of polymeric cube-corner elements by vapor-depositing or chemically depositing a metal such as aluminum, silver, or nickel. A primer layer (not shown) may be applied to the cube-corner elements 36 to promote adherence of the metallic-coating 42. As shown, a backing material 44 can be placed in contact with the metallic coating 42, and an adhesive layer 46 can be applied to the backing 44, or alternatively, the adhesive layer 46 can be applied directly to the metallic coating 42. A release paper 48 can be provided to cover the adhesive 46 until the retroreflective article 30 is adhered to a substrate such as a panel for a sign (not shown).

Figure 3:
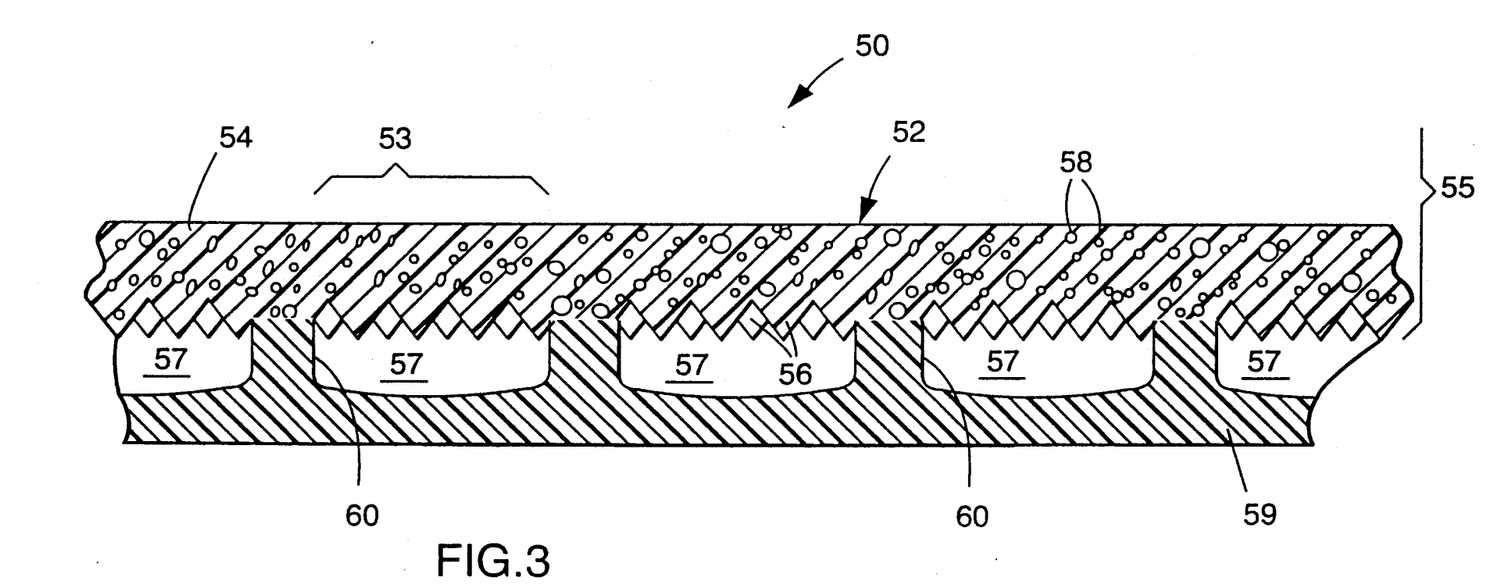
FIG. 3 is a cross-sectional view of another embodiment of a retroreflective article 50 in accordance with the present invention.

FIG. 3 illustrates an embodiment of a retroreflective article 50 of this invention where the cube-corner elements interface with air. Like retroreflective article 30 shown in FIG. 2, article 50 has opaque pigment particles 58 which have lightness improving properties and which are dispersed in a front portion 55 of a retroreflective sheeting 52. Sheeting 52 includes a body portion 54 and cube-corner elements 56 projecting away from the body portion 54. Article 50 differs from the embodiment of FIG. 2 by having the back side of the cube-corner elements 56 interface with air rather than with a metallic coating. The cube-corner/air interface is protected from moisture, dirt, and the like by providing hermetically-sealed air chambers 57. Chambers 57 are defined by a base layer 59 that is secured to the retroreflective sheeting 52 at bonding regions 60. The bonding regions 60 define a plurality of retroroflective regions 53 in the front portion 55 of article 50. Base layer 59 can be secured to the sheeting 52 using known methods such as disclosed in U.S. Pat. No. 4,025,159, incorporated here by reference.

Figure 4:
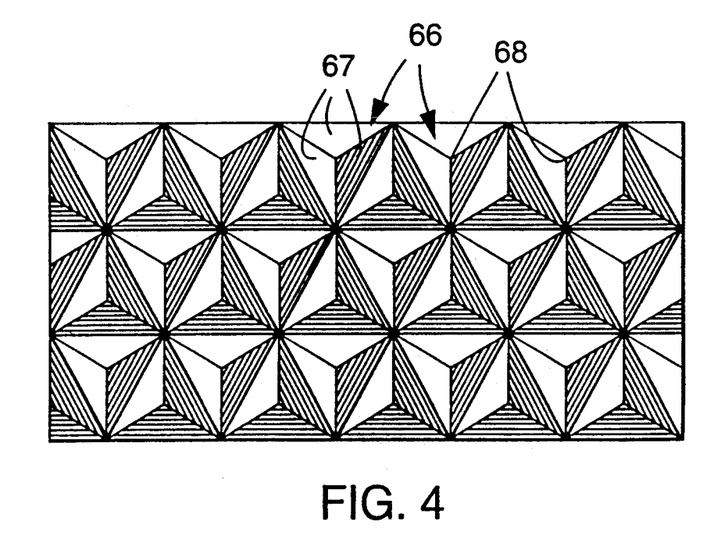
FIG. 4 is a bottom view of the backside of cube-corner elements 66 in a retroreflective sheeting.

FIG. 4 illustrates an example of cube-corner elements 66 that may be used in a retroreflective sheeting of this invention. Each cube-corner element 66 has three planar faces 67 that meet at an apex 68. The apex 68 of each cube-corner element 66 may be vertically aligned with the center of the base of the cube-corner element, see, for example, U.S. Pat. No. 3,684,348, or the apex may be canted to the center of the base as disclosed in U.S. Pat. No. 4,588,258. Of the many cube-corner configurations, see also, for example, U.S. Pat. Nos. 4,775,219, 4,243,618, 4,202,600, and 3,712,706, the cube-corner retroreflective elements described in U.S. Pat. No. 4,588,258 is particularly preferred because they provide wide angle retroreflection among multiple viewing planes. The disclosures of each of these patents are incorporated here by reference.

A retroreflective sheeting of this invention generally is about 75 micrometers (5 mils) to 600 micrometers (24 mils) thick. Each cube-corner element typically is about 60 micrometers (2.4 mils) to 200 micrometers (8 mils) high, and the body portion, typically, is about 25 micrometers (1 mil) to 250 micrometers (25 mils) thick. The body portion and the overlay film preferably interface at a substantially smooth surface to prevent the dispersion of light. Overlay film, typically, is about 25 micrometers (1 mil) to 125 micrometers (5 mils) thick.

Opaque pigments useful in this invention generally have a refractive index greater than 1.8 and include those that are designated as opaque or semi-opaque by the National Association of Printing Ink Manufacturers in the NPIRI Raw Materials Data Handbook, volume 4 (1983). Preferred opaque pigments have a refractive index greater than 2.2 and more preferably greater than 2.6. Examples of opaque pigments that have lightness improving properties are opaque pigments that diffusely reflect white light. The term "light" is used herein to mean electromagnetic radiation in the visible range, $4 \times 10^{-7}$ meters to $7.7 \times 10^{-7}$ meters approximately. Pigments that reflect white light are designated as pigment whites in the Colour Index (C.I.) published by the Society of Dyers and Colourists. Examples of white opaque pigments that may be suitable for use in this invention include the following inorganic pigments: zinc-based pigments such as zinc oxide, zinc sulfide, and lithopone; zirconium oxide; antimony oxide; and titanium dioxide. Titanium dioxide in its rutile form is the preferred opaque pigment. Examples of white, opaque pigments that may be employed to enhance sheeting lightness include the following identified by the Colour Index:

| Pigment White | 1 C.I. 77597 | Basic Carbonate White Lead |
| Pigment White | 4 C.I. 77947 | Zinc Oxide |
| Pigment White | 5 C.I. 77115 | Lithopone |
| Pigment White | 6 C.I. 77891 | Titanium Dioxide |
| Pigment White | 7 C.I. 77975 | Zinc Sulfide |
| Pigment White | 11 C.I. 77052 | Antimony Oxide |
| Pigment White | 12 C.I. 77990 | Zirconium Oxide |

Other opaque pigments that have lightness improving properties and may be suitable for use in this invention include the following pigments:

| Pigment Brown | 24 C.I. 77310 | Titanium, Chrome and Antimony Oxides |
| Pigment Yellow | 34 C.I. 77603 | Lead Sulfochromate |
| Pigment Yellow | 35 C.I. 77205 | Zinc Sulfide |
| Pigment Yellow | 37 C.I. 77199 | Cadmium Sulfide |
| Pigment Yellow | 53 C.I. 77788 | Titanium, Nickel and Antimony Oxides |
| Pigment Yellow | 161 C.I. 77895 | Titanium, Nickel and Niobium Oxides |
| Pigment Yellow | 184 | Bismuth Vanadate and Bismuth Molybdenate |

Combinations of the above pigments may also be used.

The pigment particles used in this invention preferably have a mean size ranging from about 0.1 to 5 micrometers, more preferably in the range of from about 0.5 to 2 micrometers. When titanium dioxide is used as the opaque pigment, its mean size typically ranges from about 0.2 to 0.3 micrometer. The quantity of pigment particles may vary depending on, for example, the composition of the pigment particles, the size of the pigment particles, the size and geometry of the cube corner elements, the thickness of the front portion, the color of the sheeting, and the end usage of the retroreflective article. In general, however, the pigment particles are dispersed in the front portion of the retroreflective sheeting in the range of about 0.0001 to 0.75 volume percent, and typically in the range of about 0.0002 to 0.075 volume percent and more typically in the range of 0.005 to 0.05 volume percent. The pigment particles are preferably evenly distributed throughout the front portion of the retroreflective sheeting so that uniform color, lightness, and retroreflectivity are displayed by the retroreflective article.

The retroreflective article may be colored by incorporating a dye or a transparent pigment in the front portion of the sheeting. The dye or transparent pigment may be placed, for example, in the body portion, the cube-corner elements, an overlay film, or a combination thereof. The retroreflective article also can be colored by applying an ink containing a dye or transparent pigment onto either side of an overlay film. The particular dye or transparent pigment selected depends, of course, on the desired color of the retroreflective article and on the polymeric composition of the cube-corner sheeting. The selected dye or transparent pigment should not have a deleterious effect on the article's retroreflectivity, and it should not substantially compromise the daytime lightness of the article.

Examples of dyes that may be suitable for use in this invention include:

| Violet: | C.I. Solvent Violet, 13, 31, 32, 33, and 36; |
| Blue: | C.I. Solvent Blue 94, 97, 101, and 121, and C.I. Disperse Blue 60 and 198; |
| Green: | C.I. Solvent Green 3, 26, and 28; |
| Yellow: | C.I. Solvent Yellow 93, 112, 113, 128, 129, 130, and 163, and C.I. Disperse Yellow 54, 64, and 160; |
| Orange: | C.I. Solvent Orange 60, 68, 72, and 86, and C.I. Disperse Orange 47; and |
| Red: | C.I. Solvent Red 52, 111, 117, 135, 138, 139, 169, 195, and 207, and C.I. Disperse Red 5. |

These dyes are available from one or more of the following companies: BASF Corporation, Bayer AG, Color Chem International, and Mitsubishi Chemical Industries. Amaplast Violet PK from Color Chem International also may be useful, as well as fluorescent dyes such as a thioxanthene dye, a thioindigoid dye, a benzoxazole coumarin dye, or a perylene imide dye. Retroreflective articles containing these fluorescent dyes have been disclosed in European Patent Application 0,489,561 A1 published Jun. 10, 1992, the disclosure of which is incorporated here by reference. Combinations of the above dyes also may be employed, and/or transparent pigments may be employed to provide color.

Examples of transparent pigments that may be suitable to color retroreflective articles of this invention include:

| | |
|---|---|
| Violet: | C.I. Violet, 19, 23, 27 |
| Blue: | C.I. Blue, 15 |
| Green: | C.I. Green, 7, 10, 36 |
| Yellow: | C.I. Yellow, 93, 198, 128 |
| Orange: | C.I. Orange, 43, 46 |
| Red: | C.I. Red, 177, 179, 206 |

These transparent pigments are available from one or more of the following companies: Ciba-Giegy Corporation, BASF Corporation, Sandoz Chemicals, Sun Chemicals, Hoechst Celanese and Miles Incorporated.

When the retroreflective article is colored, it is preferred that the opaque pigment particles not be incorporated into the article in front of the colored layer. Preferably, the opaque pigment particles are incorporated into the front portion of the retroreflective article in the same layer as the dye or transparent pigment, and more preferably behind the colored layer (that is, closer to the back side of the cube-corner elements). The placement of the pigment particles in front of the colored layer is not preferred because it would cause the color's saturation to become diluted.

The cube-corner sheeting for a retroreflective article of this invention can have a polymeric composition. Polymers useful for forming a cube-corner sheeting include polymers that are transmissive to visible light and are compatible with the pigment particles. If a dye is employed, the polymer should also be compatible with the selected dye. To be compatible, the polymer preferably does not allow the pigment (and dye) to migrate or bloom out from the interior of the retroreflective article. Examples of polymers that may be used in retroreflective articles of this invention include polycarbonates, polyalkylacrylates, polyalkylmethacrylates such as polymethylmethacrylate, polyesters, vinyl polymers, polyurethanes, cellulose esters, fluoropolymers, polyolefins, ionomeric copolymers and copolymers of ethylene or propylene with acrylic acid, methacrylic acid, or vinyl acetate. Combinations of such polymers also may be employed. For example, the cube-corner sheeting may be made from a blend of polymers, or the cube-corner elements and the body portion may be made from different polymers. Further, the body portion may comprise a plurality of layers of the same or different polymers. Polycarbonates are preferred polymers for a cube-corner sheeting of this invention because they possess tough, durable characteristics.

An overlay film for a retroreflective sheeting may be made from polymers similar to those of the cube-corner sheeting; typically, types which are stable to ultra-violet (UV) light and have good abrasion resistance such as acrylic polymers (e.g., polymethylmethacrylate) and copolymers. UV stabilizers may also be added to the overlay film.

Cube-corner sheetings can be made according to known techniques such as disclosed in U.S. Pat. Nos. 5,122,902, 4,938,563, 4,895,428, 4,703,999, 4,601,861, 4,576,850, 4,588,258, 4,025,159, 3,935,359, 3,811,983, and 3,810,804. The pigment particles may be dispersed in the front portion of the retroreflective article using known methods for incorporating pigments into polymers. For example, a twin-screw extruder can be employed to blend the pigment particles with the polymer.

The retroreflective articles of this invention are particularly useful for placement on signs along roadways or on motorized vehicles or trailers, particularly large trucks and truck trailers. The improved daytime conspicuity makes the articles nicely suitable for such use.

Features and advantages of this invention are further illustrated in the following Examples. It is to be expressly understood, however, that while the Examples serve this purpose, the particular ingredients and amounts used as well as other conditions and details are not to be construed in a manner that would unduly limit the scope of this invention.

EXAMPLES

Examples C-1–C-2 and 1–14

Flat colored sheets were prepared for use in fabricating cube-corner retroreflective sheetings. The flat colored sheets were prepared by first mixing Type R-960 titanium dioxide pigment (E. I. DuPont De Nemours and Company, Wilmington, Del.) with Makrolon 2407 polycarbonate pellets (Miles Inc., Pittsburgh, Pa.) in a paint shaker. The amount of titanium dioxide pigment mixed with the polycarbonate resin ranged from zero volume percent to 0.048 volume percent (0.16 wt. %). The mixtures were then dried overnight in an oven overnight at 125° C. (257° F.) and were extruded into a sheet having two smooth sides, which was subsequently cut into pieces sized to about 30 centimeters (cm) by 30 cm. The melt temperature during the extrusion was about 250° C. (483° F.), and the die temperature was about 285° C. (545° F.). The extruded sheets are listed below in Table I. The sheets produced had a thickness ranging from about 51 micrometers (2.0 mils) to approximately 122 micrometers (4.8 mils). A 3.18 cm (1¼ inch) Killion ™ single screw extruder (Killion Extruders, Inc., Cedar Grove, N.J.) coupled to a 30.5 cm (12 inch) flat sheet die was used to produce the sheets.

TABLE I

| Flat Sheet | Volume Percent Titanium Dioxide | Volume Percent Polycarbonate | Approximate Sheet Thickness (Micrometers) |
|---|---|---|---|
| A | 0.000 | 100.0000 | 102 |
| B | 0.0075 | 99.9925 | 53 |
| C | 0.0012 | 99.9880 | 121 |
| D | 0.0150 | 99.9850 | 52 |
| E | 0.0240 | 99.9760 | 119 |
| F | 0.0300 | 99.9700 | 52 |
| G | 0.0300 | 99.9700 | 122 |
| H | 0.0480 | 99.9520 | 108 |

The cut sheets set forth in Table 1 were stacked and embossed to produce a cube-corner retroreflective sheeting. Two sheets were used for each combination which will be referred to as a "blank stack". Each blank stack was embossed using a platen press to form cube-corner retroreflective elements on one side and a flat surface on the opposite side. The embossing operation involved about 5 minutes of preheating to a temperature of about 188° C. (370° F.), followed by about 20 seconds of embossing, which in turn was followed by about 8 minutes of cooling. The platen press had a pattern which produced slightly canted, three-sided cube-corner elements in accordance with the teachings of U.S. Pat. No. 4,588,258. The cube-corner array had three sets of mutually intersecting V-shaped grooves where the base edges of the lateral faces of the cube-corner elements lied in a common base plane. The cube-corner elements were arranged as matched pairs within this array, with paired elements rotated 180 degrees with respect to each other. The optical axis of the cube-corner elements in each pair were rotated towards one another by 8.15 degrees. The distance from the peak of the cube-corner elements to the base plane was approximately 0.0889 millimeters (mm).

In Examples 1-6, the blank stack was arranged such that the titanium dioxide containing sheet (sheets B-H) formed the cube-corner elements and a minor part of the body portion, and the clear polycarbonate sheet (sheet A) formed the major part of the body portion of the cube-corner sheeting. In Example 7, the blank stack had a reverse arrangement such that the titanium dioxide containing sheet formed the major part of the body portion and the clear polycarbonate sheet formed the cube-corner elements and a minor part of the body portion. After the cube-corner retroreflective sheetings were produced, each sheeting had a 90 nanometer (nm) thick layer of aluminum vapor coated on the back side of the coated cube-corner elements. The aluminum coatings were applied using a laboratory bell jar vapor coater with a resistance type heat source.

The light path through the pigmented portion of the embossed cube-corner sheeting was calculated by taking the total distance for which light entering and exiting the pigmented cube-corner elements travels (2 times the cube element height) plus the length of the light path passing through the pigmented part of the body portion of the sheeting. For example, a sheeting that has a 88.9 micrometer high, cube-corner element having a 101.6 micrometer (4 mil) thick pigmented body portion, the light path length is 383 micrometers. The light path was multiplied by volume percent of pigment to give a parameter (Light Path×Vol. % $TiO_2$) in units of micrometers ($\mu m$). This parameter was found to correspond to the increase in lightness.

Lightness of the cube-corner sheeting was measured using a spectrocolorimeter according to standardized test. ASTM E 1349-90. Lightness is expressed by the parameter termed Luminance Factor Y (LFY), which is defined as the lightness of the test sample relative to a perfect diffusing reflector. Zero degree illumination and 45 degree circumferential viewing were employed in determining the LFY. LFY values range from 0 to 100, where a LFY value of 0 represents a perfect black color and a LFY value of 100 represents a perfect white color. LFY values higher than 50 (and even higher than 70) have been demonstrated by cube-corner retroreflective articles of this invention. Using the LFY value of the clear, non-pigmented sheeting of the Comparative Example (C-1 and C-2) and the LFY value of the sheeting of the invention, the LFY Percent Gain was calculated. LFY Percent Gain for each Example is given in the Tables set forth below. Retroreflectivity of the sheetings expressed by the Coefficient of Retroreflection, $R_A$, was determined using standarized test ASTM E 810-91. $R_A$ values are the ratio of the coefficient of luminous intensity of a plane retroreflective surface to its area and are expressed in units of candelas per lux per square meter (cd. $1x^{-1}m^{-2}$). $R_A$ values greater than 600 are readily obtainable by retroreflective articles of this invention which also exhibit LFY values of 30 or better. Measurements of $R_A$ were made at a $-4°$ entrance angle and a 0.2 degree observation angle. The $R_A$ values set forth in the following Tables are the average of one measurement taken at a zero degree rotational angle and one measurement taken at a 90 degree rotational angle.

TABLE II

| Example | Sheets Used Body, Cube | $TiO_2$ (Vol %) | Light Path × Vol. % $TiO_2$ ($\mu m$) | $R_A$ (cd · $lx^{-1}$ · $m^{-2}$) | LFY % Gain[1] |
|---|---|---|---|---|---|
| C-1 | A, A | 0.0000 | 0.0000 | 1476 | 0 |
| 1 | A, B | 0.0075 | 0.0169 | 1158 | 446.6 |
| 2 | A, D | 0.0150 | 0.0334 | 1004 | 670.8 |
| 3 | A, C | 0.0120 | 0.0432 | 876 | 803.4 |
| 4 | A, F | 0.0300 | 0.0668 | 684 | 923.0 |
| 5 | A, E | 0.0240 | 0.0858 | 485 | 1068.9 |
| 6 | A, G | 0.0480 | 0.1739 | 163 | 1334.8 |
| 7 | H, A | 0.0480 | 0.1036 | 352 | 1213.7 |

[1]LFY % Gain was calculated from a base LFY value of 3.2. The base LFY value was the LFY value of Example C-1.

The data shown in Table II demonstrates that an increase in white pigment loading level dramatically increases the aluminum coated, cube-corner sheeting's LFY lightness value while still allowing the sheeting to be significantly retroreflective as expressed in the $R_A$ values.

Examples C-2 and 8-14 were prepared and tested as described above, except the back sides of the cube-corner sheetings were vapor coated with a 120 nm thick layer of silver in place of the 90 nm thick layer of aluminum. The data for these Examples is shown below in Table III.

TABLE III

| Example | Sheets Used Body, Cube | $TiO_2$ (Vol %) | Light Path × Vol. % $TiO_2$ ($\mu m$) | $R_A$ (cd · $lx^{-1}$ · $m^{-2}$) | LFY % Gain |
|---|---|---|---|---|---|
| C-2 | A, A | 0.0000 | 0.0000 | 2175 | 0 |
| 8 | A, B | 0.0075 | 0.0169 | 1688 | 394.2 |
| 9 | A, D | 0.0150 | 0.0334 | 1434 | 627.1 |
| 10 | A, C | 0.0120 | 0.0432 | 1308 | 725.4 |
| 11 | A, F | 0.0300 | 0.0668 | 940 | 798.3 |
| 12 | A, E | 0.0240 | 0.0858 | 695 | 913.6 |
| 13 | A, G | 0.0480 | 0.1739 | 212 | 1157.6 |

TABLE III-continued

| Example | Sheets Used Body, Cube | TiO$_2$ (Vol %) | Light Path × Vol. % TiO$_2$ (μm) | R$_A$ (cd·lx$^{-1}$·m$^{-2}$) | LFY % Gain |
|---|---|---|---|---|---|
| 14 | H, A | 0.0480 | 0.1036 | 553 | 1020.3 |

[1]LFY % Gain was calculated from a base LFY value of 5.9. The base LFY value was the LFY value of Example C-2.

The data set forth in Table III demonstrates that an increase in white pigment loading dramatically increases the silver coated, cube-corner sheeting's LFY lightness value while still allowing the sheeting to be significantly retroreflective.

Examples C-3 and 15-17

The Examples were prepared as described above except transparent fluorescent polycarbonate blanks were used in place of the clear non-pigmented blanks. The transparent fluorescent sheeting was produced by placing 0.45 weight percent of Hostasol Red GG dye (available from Hoechst Celanese Corporation, Somerville, N.J.) in a polycarbonate resin (Makrolon Type 2407). The dye-containing resin was extruded to produce a flat sheet 127 micrometers thick. This sheet was cut into 30 cm by 30 cm pieces which were stacked upon a clear polycarbonate sheet (Example C-3) or upon a white pigmented polycarbonate sheet (Examples 15-17). Three different levels of R-960 titanium dioxide pigment were used in Examples 15-17 to produce three different white pigmented polycarbonate sheets (see Table IV). One of each of the titanium dioxide pigmented sheets was combined with a fluorescent colored sheet, and they were embossed as described in the above Examples. In forming the cube-corner sheetings, the clear sheet (Example C-3) and the pigmented sheets (Examples 15-17) were placed against the patterned platen, and the fluorescent colored sheets were placed against the smooth platen. The light path through the pigmented portion of each of the sheetings was determined to be 347 micrometers. Following the embossing step, the cube-corner sheetings were vapor coated with a 90 nm thick layer of aluminum as described in Examples C-1 and 1-7. In addition to measuring the R$_A$ and LFY, the maximum spectral reflectance factor (MSRF) in the 600 to 620 nanometer light range was measured using a Hunter Labscan 6000 zero degree/45 degree spectrocolorimeter in accordance with standardized test ASTM E 991-90. The MSRF is the ratio of the sum of the spectral radiance reflected and emitted from the fluorescent specimen, to the spectral radiance reflected from the perfect reflecting diffuser, identically irradiated. The data pertaining to R$_A$, LFY and MSRF is shown below in Table IV.

TABLE IV

| Example | TiO$_2$ (Vol. %) | R$_A$ (cd·lx$^{-1}$·m$^{-2}$) | LFY[1] % Gain | MSRF at 600-620 Nanometers |
|---|---|---|---|---|
| C-3 | .0000 | 780 | 00 | 47 |
| 15 | .0120 | 427 | 39 | 70 |
| 16 | .0240 | 279 | 57 | 81 |
| 17 | .0480 | 96 | 77 | 91 |

[1]LFY % Gain was calculated from a base LFY value of 16. The base LFY value was the LFY value of Example C-3.

The data set forth in Table IV shows that fluorescent colored cube-corner sheetings, which have white pigment particles incorporated into the front portion of the sheeting and have an aluminum vapor-coated back side, demonstrate substantially improved lightness, good retroreflectivity, and notable improvement in the MSRF. Part of the percent gain in MSRF can be attributed to the titanium dioxide pigment, which increased the lightness of the color. However, a portion of the gain in MSRF can be attributed to the increase in fluorescence. To show this, in accordance with ASTM E 1247-88, a red PMMA film was inserted between the Lab Scan II light source and the sample specimens. This test was used to detect fluorescence by comparing the MSRF at specific light wavelengths with and without the red PMMA filter. The use of the red filter in this test eliminated the excitation light wavelengths, and thus the fluorescent sheetings were rendered non-fluorescent. The data pertaining to the LFY and MSRF with and without the red filter is shown in Table V. The MSRF differences were determined by subtracting the values obtained with the red filter from the values obtained without the filter.

TABLE V

| Example | LFY W/O Red Filter (μm) | LFY W/Red Filter (μm) | LFY Difference (μm) | MSRF W/O Red Filter | MSRF W/Red Filter | MSRF Difference |
|---|---|---|---|---|---|---|
| C-3 | 19.54 | 5.83 | 13.71 | 59.77 | 9.93 | 49.84 |
| 15 | 24.80 | 11.83 | 12.97 | 80.69 | 28.14 | 52.55 |
| 16 | 28.23 | 15.09 | 13.14 | 94.21 | 37.68 | 56.53 |
| 17 | 31.32 | 18.15 | 13.27 | 103.81 | 45.59 | 58.22 |

The data set forth in Table V shows that while the difference in LFY remained relatively constant (lightness did not increase), the difference in MSRF increased significantly with increased amounts of opaque pigment for these aluminum vapor coated fluorescent sheetings. The MSRF difference increase shows that there was a significant increase in fluorescence. ASTM E 1247-88 considers an increase in fluorescence to be significant if the MSRF difference is greater than one percent.

Examples C-4 and 18-20

These Examples were prepared and tested as described in Examples C-3 and 15-17, except that the back side of the sheeting was coated with a 120 nm thick layer of silver.

TABLE VI

| Example | TiO$_2$ (Vol. %) | R$_A$ (cd·lx$^{-1}$·m$^{-2}$) | LFY[1] % Gain | MSRF at 600–620 Nanometers |
|---|---|---|---|---|
| C-4 | .0000 | 1188 | 00 | 72 |
| 18 | .0120 | 686 | 52 | 117 |
| 19 | .0240 | 399 | 68 | 129 |
| 20 | .0480 | 128 | 87 | 143 |

[1]LFY % Gain was calculated from a base LFY value of 22.2 The base LFY value was the LFY value of Example C-4.

The data set forth in Table VI shows that fluorescent colored cube-corner sheetings, which have white pigment particles incorporated into the front portion of the sheeting and have a silver vapor-coated back side, demonstrate substantially improved lightness, good retroreflectivity, and good fluorescence over a similar non-pigmented article. These sheetings were also tested in accordance with ASTM E 1247-88 to determine if fluorescence was improved. In this latter test, the differences in LFY ranged from 17.39 to 18.95 and the MSRF differences increased about 8 percent between Example C-4 and Example 20, thereby demonstrating a significant increase in fluorescence.

Examples C-5 and 21–23

These Examples were prepared and tested as described in Examples C-4 and 18–20, respectively, except the back side of the cube-corner elements was not vapor-coated with aluminum. Instead, a base layer of polyester (40.6 micrometer thick) having titanium dioxide pigment particles dispersed therein was thermally bonded to the cube-corner sheetings to form a multitude of hexagonally-shaped, hermetically-sealed air chambers of about 4 millimeters in size. The resulting cube-corner sheeting thus had in the front portion a number of retroreflective regions encompassed by the bonding regions (see for example FIG. 3). The sheeting was tested as described above, and the data for R$_A$, LFY % Gain, and MSRF is set forth below in Table VII.

TABLE VII

| Example | TiO$_2$ (Vol. %) | R$_A$ (cd·lx$^{-1}$·m$^{-2}$) | LFY[1] % Gain | MSRF at 600–620 Nanometers |
|---|---|---|---|---|
| C-5 | .0000 | 441 | 00 | 120 |
| 21 | .0120 | 258 | 11 | 130 |
| 22 | .0240 | 153 | 16 | 139 |
| 23 | .0480 | 48 | 25 | 150 |

[1]LFY % Gain was calculated from a base LFY value of 34.3 The base LFY value was the LFY value of Example C-5.

The data set forth in Table VII shows that the fluorescent colored cube-corner sheetings (which have white pigment particles incorporated into the front portion of the sheeting and have a sealed base layer on the back side) demonstrate improved lightness, good retroreflectivity, and good fluorescence over a similar non-pigmented article. These sheetings were also tested in accordance with ASTM-1247-88 to determine if fluorescence was improved. The differences in LFY ranged from 15.10 to 15.87, and the MSRF difference increased about 4 percent between Example C-5 and Example 23, thereby demonstrating a significant increase in fluorescence.

This invention may take on various modifications and alterations without departing from the spirit and scope thereof. Accordingly, it is to be understood that this invention is not to be limited to the above-described, but is to be controlled by the limitations set forth in the following claims and any equivalents thereof. It is also to be understood that this invention may be suitably practiced in the absence of any element not specifically disclosed herein.

What is claimed is:

1. A retroreflective article that comprises:
   a sheeting having a front portion that includes a retroreflective region that has a body portion and a plurality of cube-corner elements which project away from the body portion; and
   opaque pigment particles that have lightness improving properties, the opaque pigment particles being dispersed in the retroreflective region of the front portion of the sheeting.

2. The retroreflective article of claim 1, wherein the opaque pigment particles are dispersed in the body portion or cube-corner elements of the front portion of the sheeting.

3. The retroreflective article of claim 1, wherein the back side of the cube-corner elements has a metallic coating placed thereon.

4. The retroreflective article of claim 3, wherein the metallic coating is aluminum or silver.

5. The retroreflective article of claim 1, wherein the back side of the cube-corner elements interfaces with air contained in a plurality of hermetically sealed air chambers.

6. The retroreflective article of claim 1, wherein the opaque pigment particles have a refractive index greater than 1.8.

7. The retroreflective article of claim 6, wherein the opaque pigment particles have a refractive index greater than 2.2.

8. The retroreflective article of claim 7, wherein the opaque pigment particles have a refractive index greater than 2.6.

9. The retroreflective article of claim 8, wherein the opaque pigment particles include rutile titanium dioxide pigment particles.

10. The retroreflective article of claim 7, wherein the opaque pigment particles have a mean size ranging from 0.1 to 5 micrometers.

11. The retroreflective article of claim 10, wherein the opaque pigment particles have a mean size ranging from 0.5 to 2 micrometers.

12. The retroreflective article of claim 6, wherein the opaque pigment particles diffusely reflect white light.

13. The retroreflective article of claim 6, wherein the opaque pigment particles are selected from the group consisting of Colour Index Pigment White 1, 4, 5, 6, 7, 11, 12, and combinations thereof.

14. The retroreflective article of claim 6, wherein the opaque pigment particles are dispersed in the front portion of the retroreflective sheeting in the range of 0.0001 to 0.75 volume percent.

15. The retroreflective article of claim 14, wherein the opaque pigment particles are dispersed in the front portion of the sheeting in the range of 0.0002 to 0.075 volume percent.

16. The retroreflective article of claim 15, wherein the opaque pigment particles are dispersed in the front portion of the sheeting in the range of 0.005 to 0.05 volume percent.

17. The retroreflective article of claim 1, wherein the opaque pigment particles are selected from the group consisting of Colour Index Pigment White 1, 4, 5, 6, 7, 11, 12, Pigment Brown 24, Pigment Yellow 34, 35, 37, 53, 161, 184, and combinations thereof.

18. The retroreflective article of claim 1, wherein the front portion of the sheeting has a layer that is colored by having dye or transparent pigment incorporated therein.

19. The retroreflective article of claim 18, wherein the opaque pigment particles are not located in the sheeting in front of the colored layer.

20. The retroreflective article of claim 1, wherein retroreflective article displays a fluorescent daytime color.

21. The retroreflective article of claim 1, which demonstrates a Luminance Factor Y of 50 or greater when tested according to ASTM E 1349-90.

22. The retroreflective article of claim 21, which demonstrates a Coefficient of Retroreflection of greater than 160 when tested according to ASTM E 810-91.

23. The retroreflective article of claim 1, wherein the Luminance Factor Y is 30 or greater and the Coefficient of Retroreflection is 600 or better when tested according to ASTM E 1349-90 and ASTM E 810-91, respectively.

24. A method of making a retroreflective article, which method comprises:
dispersing opaque pigment particles in at least a retroreflective region of a front portion of a sheeting that contains a plurality of cube-corner elements, wherein the dispersed opaque pigment particles possess lightness improving properties.

25. The method of claim 24, wherein the opaque pigment particles are titanium dioxide pigment particles that have a refractive index greater than 2.6 and have a mean size in the range of 0.2 to 0.3 micrometer, and are dispersed in the front portion of the sheeting in the range of 0.002 to 0.05 volume percent.

26. The method of claim 24, wherein the front portion of the sheeting has a fluorescent colored layer therein, and the opaque pigment particles are not dispersed substantially in front of the fluorescent colored layer.

* * * * *

UNITED STATES PATENT AND TRADEMARK OFFICE
CERTIFICATE OF CORRECTION

PATENT NO. : 5,272,562

DATED : December 21, 1993

INVENTOR(S) : James C. Coderre

It is certified that error appears in the above-indentified patent and that said Letters Patent is hereby corrected as shown below:

Col. 7, line 8, "198" should be --109--.

Col. 16, line 18, after "layer" insert --located--.

Signed and Sealed this

Tenth Day of May, 1994

Attest:

BRUCE LEHMAN

Attesting Officer   Commissioner of Patents and Trademarks